(12) United States Patent
Vaccaro et al.

(10) Patent No.: US 10,431,909 B2
(45) Date of Patent: *Oct. 1, 2019

(54) LASER WELD COAXIAL CONNECTOR AND INTERCONNECTION METHOD

(71) Applicant: CommScope Technologies LLC, Hickory, NC (US)

(72) Inventors: Ronald A. Vaccaro, Shorewood, IL (US); Kendrick Van Swearingen, Woodridge, IL (US); James P. Fleming, Orland Park, IL (US); James J. Wlos, Crete, IL (US); Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,991

(22) Filed: Sep. 8, 2014

(65) Prior Publication Data

US 2014/0377988 A1    Dec. 25, 2014

Related U.S. Application Data

(63) Continuation of application No. 12/951,558, filed on Nov. 22, 2010, now Pat. No. 8,826,525.

(51) Int. Cl.
*H01R 43/02* (2006.01)
*H01R 9/05* (2006.01)
(Continued)

(52) U.S. Cl.
CPC ............. *H01R 9/05* (2013.01); *B23K 20/129* (2013.01); *B23K 26/282* (2015.10); *B23K 26/32* (2013.01);
(Continued)

(58) Field of Classification Search
CPC .... H01R 24/38; H01R 24/40; H01R 43/0221; H01R 9/05; H01R 9/0512
(Continued)

(56) References Cited

U.S. PATENT DOCUMENTS 3,089,105 A    5/1963    Andrew
3,142,716 A    7/1964    Gardener
(Continued)

FOREIGN PATENT DOCUMENTS

CN    1606200 A    4/2005
CN    1623254 A    6/2005
(Continued)

OTHER PUBLICATIONS

Azm A Parvez, USPTO Official Action for related U.S. Appl. No. 13/240,344; dated Apr. 23, 2014.
(Continued)

*Primary Examiner* — Renee S Luebke
*Assistant Examiner* — Paul Baillargeon
(74) *Attorney, Agent, or Firm* — Myers Bigel, P.A.

(57) ABSTRACT

A coaxial connector, the coaxial connector interconnectable with a coaxial cable by a process including providing a connector body with a bore; inserting a leading end of the coaxial cable into the bore from a cable end of the connector body, and laser welding between the outer conductor and the connector body from a connector end of the connector body.

10 Claims, 20 Drawing Sheets

(51) Int. Cl.
*H01R 24/38* (2011.01)
*B23K 20/12* (2006.01)
*H01R 4/02* (2006.01)
*H01R 4/62* (2006.01)
*B23K 26/32* (2014.01)
*B23K 26/282* (2014.01)
*B23K 101/06* (2006.01)
*B23K 101/38* (2006.01)
*B23K 103/10* (2006.01)
*B29C 65/06* (2006.01)
*B29C 65/48* (2006.01)
*B29C 65/64* (2006.01)
*B29C 65/00* (2006.01)
*H01R 13/504* (2006.01)
*H01R 13/622* (2006.01)

(52) U.S. Cl.
CPC ............ *H01R 4/029* (2013.01); *H01R 4/625* (2013.01); *H01R 43/0221* (2013.01); *B23K 2101/06* (2018.08); *B23K 2101/38* (2018.08); *B23K 2103/10* (2018.08); *B29C 65/0672* (2013.01); *B29C 65/48* (2013.01); *B29C 65/4855* (2013.01); *B29C 65/645* (2013.01); *B29C 66/5344* (2013.01); *B29C 66/742* (2013.01); *H01R 13/504* (2013.01); *H01R 13/622* (2013.01); *H01R 24/38* (2013.01); *Y10T 29/49002* (2015.01); *Y10T 29/49117* (2015.01); *Y10T 29/49123* (2015.01)

(58) Field of Classification Search
USPC .................. 439/578, 581, 874, 604, 606
See application file for complete search history.

(56) References Cited

U.S. PATENT DOCUMENTS

| | | | |
|---|---|---|---|
| 3,219,557 A | 11/1965 | Quintana | |
| 3,245,027 A | 4/1966 | Ziegler, Jr. | |
| 3,264,602 A | 8/1966 | Schwartz | |
| 3,295,095 A | 12/1966 | Kraus | |
| 3,384,703 A | 5/1968 | Forney et al. | |
| 3,453,376 A | 7/1969 | Ziegler et al. | |
| 3,644,878 A | 2/1972 | Toedtman | |
| 3,656,092 A | 4/1972 | Swengel et al. | |
| 3,665,367 A | 5/1972 | Keller et al. | |
| 3,690,088 A * | 9/1972 | Anderson | B29C 65/0672 156/73.5 |
| 3,720,805 A | 3/1973 | Fitzgerald | |
| 3,949,466 A | 4/1976 | O'Brien et al. | |
| 3,980,976 A | 9/1976 | Tadama et al. | |
| 4,039,244 A | 8/1977 | Leachy | |
| 4,176,909 A | 12/1979 | Prunier | |
| 4,241,973 A | 12/1980 | Mayer et al. | |
| 4,521,642 A | 6/1985 | Vives | |
| 4,746,305 A | 5/1988 | Nomura | |
| 4,790,375 A | 12/1988 | Bridges et al. | |
| 4,824,400 A | 4/1989 | Spinner | |
| 4,846,714 A | 7/1989 | Welsby et al. | |
| 4,867,370 A | 9/1989 | Welter et al. | |
| 5,046,952 A | 9/1991 | Cohen et al. | |
| 5,076,657 A | 12/1991 | Toya et al. | |
| 5,120,237 A | 6/1992 | Fussell | |
| 5,120,268 A | 6/1992 | Gerrans | |
| 5,137,478 A | 8/1992 | Graf et al. | |
| 5,142,763 A | 9/1992 | Toya et al. | |
| 5,154,636 A | 10/1992 | Vaccaro | |
| 5,186,644 A | 2/1993 | Pawlicki et al. | |
| 5,203,079 A | 4/1993 | Brinkman et al. | |
| 5,284,449 A | 2/1994 | Vaccaro | |
| 5,299,939 A | 4/1994 | Walker et al. | |
| 5,354,217 A | 10/1994 | Gabel et al. | |
| 5,464,963 A * | 11/1995 | Hostler | B23K 26/0823 219/121.6 |
| 5,474,470 A | 12/1995 | Hammond, Jr. | |
| 5,542,861 A | 8/1996 | Anhalt et al. | |
| 5,561,900 A | 8/1996 | Hosler, Sr. | |
| 5,700,989 A * | 12/1997 | Dykhno | B23K 28/02 219/121.45 |
| 5,733,145 A | 3/1998 | Wood | |
| 5,789,725 A | 8/1998 | McIntire et al. | |
| 5,791,919 A | 8/1998 | Brisson et al. | |
| 5,796,315 A | 8/1998 | Gordon et al. | |
| 5,802,710 A | 9/1998 | Bufanda et al. | |
| 5,823,824 A | 10/1998 | Mitamura et al. | |
| 5,929,728 A | 7/1999 | Barnett et al. | |
| 5,938,474 A | 8/1999 | Nelson | |
| 5,994,646 A | 11/1999 | Broeksteeg et al. | |
| 6,007,378 A | 12/1999 | Oeth | |
| 6,032,836 A | 3/2000 | Burt | |
| 6,093,043 A | 7/2000 | Gray et al. | |
| 6,139,354 A | 10/2000 | Broussard | |
| 6,148,237 A | 11/2000 | Das | |
| 6,155,212 A | 12/2000 | McAlister | |
| 6,173,097 B1 | 1/2001 | Throckmorton et al. | |
| 6,174,200 B1 | 1/2001 | Bigotto et al. | |
| 6,287,301 B1 | 9/2001 | Thompson et al. | |
| 6,361,364 B1 | 3/2002 | Holland et al. | |
| 6,362,428 B1 | 3/2002 | Pennington | |
| 6,394,187 B1 | 5/2002 | Dickson et al. | |
| 6,407,722 B1 | 6/2002 | Bogner et al. | |
| 6,439,924 B1 | 8/2002 | Kooiman | |
| 6,471,545 B1 | 8/2002 | Hosler, Sr. | |
| 6,482,036 B1 | 11/2002 | Broussard | |
| 6,538,203 B1 | 3/2003 | Nolle et al. | |
| 6,588,646 B2 | 7/2003 | Loprire | |
| 6,607,399 B2 | 8/2003 | Endo et al. | |
| 6,752,668 B2 | 6/2004 | Koch, Jr. | |
| 6,776,620 B2 | 8/2004 | Noda | |
| 6,786,767 B1 | 9/2004 | Fuks et al. | |
| 6,790,080 B2 | 9/2004 | Cannon | |
| 6,793,095 B1 | 9/2004 | Dulisse et al. | |
| 6,814,625 B2 | 11/2004 | Richmond et al. | |
| 6,837,751 B2 | 1/2005 | Vanden Wymelenberg et al. | |
| 6,932,644 B1 | 8/2005 | Taylor | |
| 6,974,615 B2 * | 12/2005 | Hosaka | H01R 4/024 174/257 |
| 7,044,785 B2 | 5/2006 | Harwath et al. | |
| 7,061,829 B2 | 6/2006 | Scott | |
| 7,114,990 B2 * | 10/2006 | Bence | H01R 9/05 439/322 |
| 7,134,190 B2 | 11/2006 | Bungo et al. | |
| 7,144,274 B2 | 12/2006 | Taylor | |
| 7,198,208 B2 | 4/2007 | Dye et al. | |
| 7,217,154 B2 | 5/2007 | Harwath | |
| 7,347,738 B2 | 3/2008 | Hsieh et al. | |
| 7,399,069 B2 | 7/2008 | Therien | |
| 7,476,114 B1 * | 1/2009 | Contreras | H01R 4/70 439/201 |
| 7,520,779 B2 | 4/2009 | Arnaud et al. | |
| 7,607,942 B1 | 8/2009 | Van Swearingen | |
| 7,677,812 B2 | 3/2010 | Castagna | |
| 7,705,238 B2 | 4/2010 | Van Swearingen | |
| 7,731,529 B1 | 6/2010 | Islam | |
| 7,753,727 B1 | 7/2010 | Islam et al. | |
| 7,798,848 B2 | 9/2010 | Islam | |
| 7,819,302 B2 | 10/2010 | Bolser et al. | |
| 8,113,879 B1 | 2/2012 | Zraik | |
| 8,174,132 B2 | 5/2012 | Van Swearingen | |
| 8,302,296 B2 | 11/2012 | Van Swearingen | |
| 8,453,320 B2 * | 6/2013 | Van Swearingen | B23K 20/10 29/828 |
| 8,479,383 B2 | 7/2013 | Van Swearingen | |
| 8,622,762 B2 | 1/2014 | Van Swearingen et al. | |
| 8,801,460 B2 | 8/2014 | Van Swearingen et al. | |
| 8,826,525 B2 * | 9/2014 | Vaccaro | B23K 20/129 219/121.6 |
| 8,887,379 B2 * | 11/2014 | Van Swearingen | B23K 20/129 29/748 |

(56) References Cited

U.S. PATENT DOCUMENTS

| | | | |
|---|---|---|---|
| 9,889,586 | B2 | 2/2018 | Van Swearingen et al. |
| 2003/0137372 | A1 | 7/2003 | Fehrenbach et al. |
| 2004/0082212 | A1 | 4/2004 | Cannon |
| 2005/0181652 | A1 | 8/2005 | Montena et al. |
| 2006/0137893 | A1 | 6/2006 | Sumi et al. |
| 2007/0042642 | A1 | 2/2007 | Montena et al. |
| 2007/0224880 | A1 | 9/2007 | Wlos et al. |
| 2007/0259565 | A1 | 11/2007 | Holland |
| 2007/0272724 | A1 | 11/2007 | Christopherson, Jr. |
| 2009/0151975 | A1 | 6/2009 | Moe et al. |
| 2009/0218027 | A1 | 9/2009 | Moe |
| 2009/0232594 | A1 | 9/2009 | Ng et al. |
| 2010/0041271 | A1* | 2/2010 | Van Swearingen .......... B29C 45/14639 439/583 |
| 2010/0130060 | A1 | 5/2010 | Islam |
| 2010/0190377 | A1 | 7/2010 | Islam |
| 2010/0190378 | A1 | 7/2010 | Islam |
| 2010/0233903 | A1 | 9/2010 | Islam |
| 2010/0288819 | A1 | 11/2010 | Huenig et al. |
| 2012/0124827 | A1 | 5/2012 | Baldauf |
| 2012/0129375 | A1 | 5/2012 | Van Swearingen |
| 2012/0129383 | A1 | 5/2012 | Van Swearingen |
| 2012/0129390 | A1 | 5/2012 | Van Swearingen |
| 2012/0129391 | A1 | 5/2012 | Van Swearingen et al. |
| 2013/0084738 | A1 | 4/2013 | Van Swearingen et al. |
| 2013/0084740 | A1 | 4/2013 | Paynter et al. |
| 2015/0229070 | A1 | 8/2015 | Van Swearingen |
| 2017/0133769 | A1 | 5/2017 | Harwath et al. |
| 2017/0170612 | A1* | 6/2017 | Van Swearingen .... H01R 4/029 |
| 2017/0338613 | A1* | 11/2017 | Van Swearingen ...... H01R 9/05 |

FOREIGN PATENT DOCUMENTS

| | | | | |
|---|---|---|---|---|
| CN | 101055948 | A | 10/2007 | |
| CN | 201084845 | | 7/2008 | |
| CN | 101494326 | A | 7/2009 | |
| CN | 102610973 | A | 7/2012 | |
| DE | 42 10 547 | C1 | 6/1993 | |
| EP | 0555933 | | 8/1993 | |
| EP | 0779676 | | 6/1997 | |
| EP | 1001496 | | 5/2000 | |
| EP | 2214265 | | 8/2010 | |
| EP | 2219267 | A1 | 8/2010 | |
| FR | 2164172 | | 7/1993 | |
| GB | 2057781 | A * | 4/1981 | ............. H01R 24/40 |
| GB | 2335804 | | 9/1999 | |
| JP | 2002310117 | A | 10/2002 | |
| WO | 94/13040 | | 6/1994 | |
| WO | 2005/104301 | | 11/2005 | |
| WO | WO2009052691 | | 4/2009 | |

OTHER PUBLICATIONS

Sung Hee Kim, International Search Report from related PCT filing PCT/US/2011/046048, Seo-Gu, Daejeon, Republic of South Korea, dated Feb. 9, 2012.
Chinese Office Action and Search Report Corresponding to Chinese Application No. 201380057933.8; dated Jun. 30, 2016; Foreign Text 8 Pages, English Translation Thereof, 9 Pages.
European Examination Report Corresponding to European Patent Application No. 11 843 870.4; dated Aug. 18, 2016; 5 Pages.
European Examination Report Corresponding to European Patent Application No. 11 843 870.4; dated Mar. 10, 2017; 5 Pages.
Examination Report corresponding to European Application No. 13853093.6 dated Oct. 18, 2017.
Examination Report corresponding to European Application No. 11843870.4 dated Nov. 14, 2017.
Office Action corresponding to Chinese Application No. 201380087933.3 dated Jun. 30, 2016.
Office Action corresponding to Indian Application No. 4592/DELNP/2013 dated Jul. 23, 2018.
Office Action corresponding to Indian Application No. 4591/DELNP/2013 dated Aug. 7, 2018.
Office Action corresponding to Indian Application No. 3912/CHENP/2013 dated Aug. 27, 2018.
Office Action corresponding to Indian Application No. 2354/DELNP/2014 dated Sep. 7, 2018.
Office Action corresponding to Indian Application No. 4594/DELNP/2013 dated Sep. 27, 2018.
Examination Report Corresponding to European Patent Application No. 11843870.4 dated Nov. 28, 2018.
Office Action corresponding to Indian Application No. 4590/DELNP/2013 dated Dec. 1, 2018.
Office Action corresponding to Indian Application No. 3530/DELNP/2015 dated Jan. 22, 2019.
Office Action corresponding to Indian Application No. 2277/DELNP/2018 dated Jan. 24, 2019.
Office Action corresponding to Indian Application No. 3975/CHENP/2013 dated Nov. 13, 2018.
Office Action corresponding to Indian Application No. 2355/DELNP/2014 dated Jan. 23, 2019.

* cited by examiner

LASER WELD COAXIAL CONNECTOR AND INTERCONNECTION METHOD

BACKGROUND

Field of the Invention

This invention relates to electrical cable connectors. More particularly, the invention relates to a coaxial cable connector interconnectable via laser welding.

Description of Related Art

Coaxial cable connectors are used, for example, in communication systems requiring a high level of precision and reliability.

To create a secure mechanical and optimized electrical interconnection between the cable and the connector, it is desirable to have generally uniform, circumferential contact between a leading edge of the coaxial cable outer conductor and the connector body. A flared end of the outer conductor may be clamped against an annular wedge surface of the connector body via a coupling body. Representative of this technology is commonly owned U.S. Pat. No. 6,793,529 issued Sep. 21, 2004 to Buenz. Although this type of connector is typically removable/re-useable, manufacturing and installation is complicated by the multiple separate internal elements required, interconnecting threads and related environmental seals.

Connectors configured for permanent interconnection via solder and/or adhesive interconnection are also well known in the art. Representative of this technology is commonly owned U.S. Pat. No. 5,802,710 issued Sep. 8, 1998 to Bufanda et al.

However, solder and/or adhesive interconnections may be difficult to apply with high levels of quality control, resulting in interconnections that may be less than satisfactory, for example when exposed to vibration and/or corrosion over time.

Competition in the coaxial cable connector market has focused attention on improving electrical performance and long term reliability of the cable to connector interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Aluminum has been applied as a cost-effective alternative to copper for the conductors in coaxial cables. However, aluminum oxide surface coatings quickly form upon air-exposed aluminum surfaces. These aluminum oxide surface coatings may degrade traditional mechanical, solder and/or conductive adhesive interconnections.

The inventors have recognized that increasing acceptance of coaxial cable with solid outer conductors of aluminum and/or aluminum alloy enables connectors configured for interconnection via laser welding between the outer conductor and a connector body which may also be cost effectively provided, for example, formed from aluminum and/or aluminum alloy.

Figure 1:
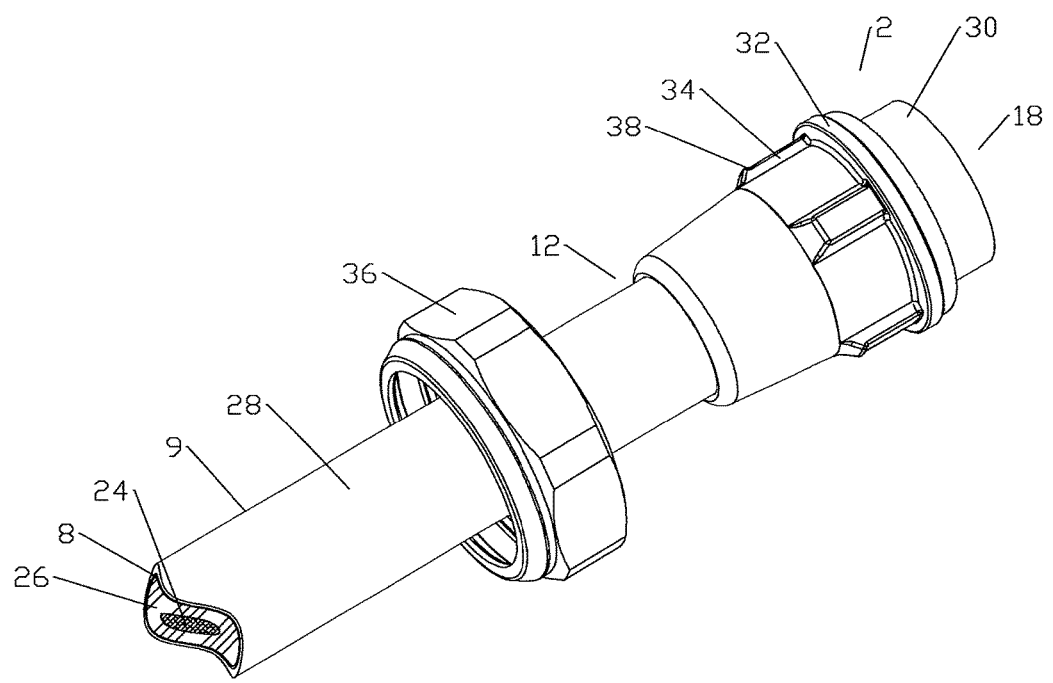
FIG. 1 is a schematic external isometric view of an exemplary embodiment of a coaxial connector installed upon a coaxial cable with a coupling nut spaced away from the connector along the cable for connector-to-cable interconnection.
Figure 2:
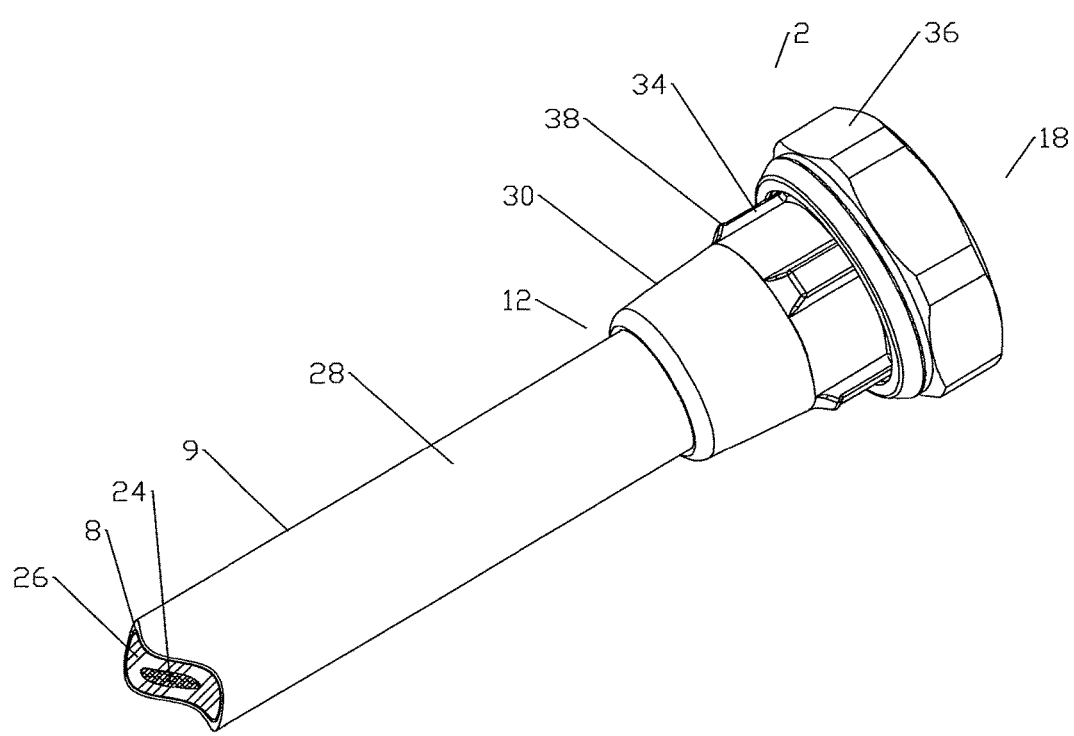
FIG. 2 is a schematic isometric view of the coaxial connector of FIG. 1 installed upon a coaxial cable, with the coupling nut seated upon the coaxial connector.
Figure 3:
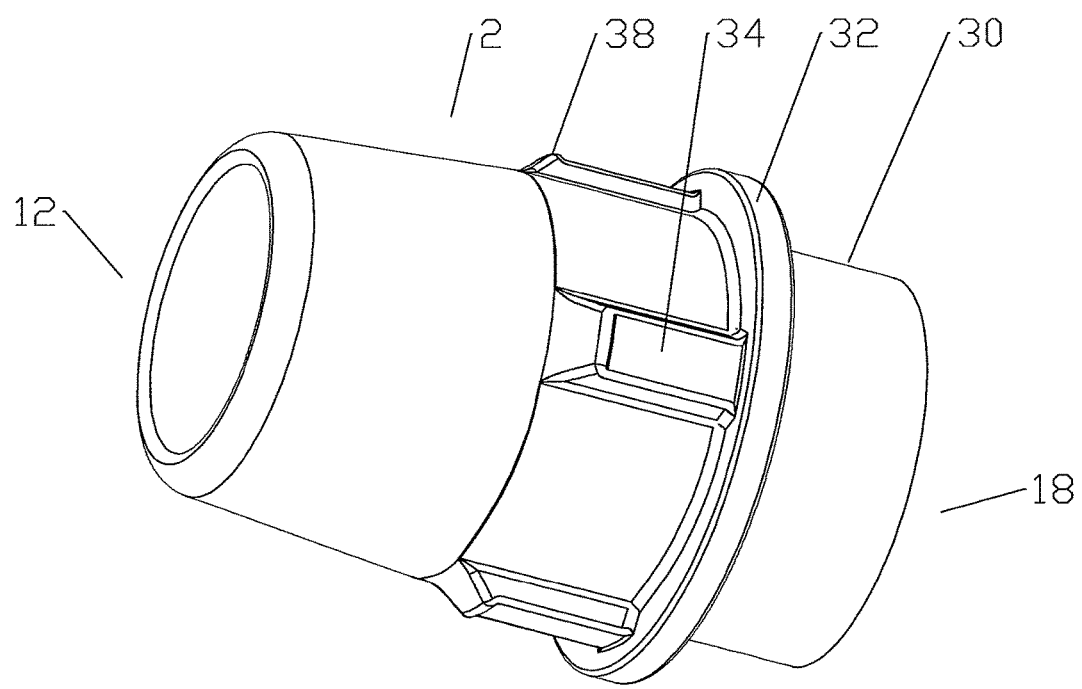
FIG. 3 is a schematic isometric view of the coaxial connector of FIG. 1.
Figure 4:
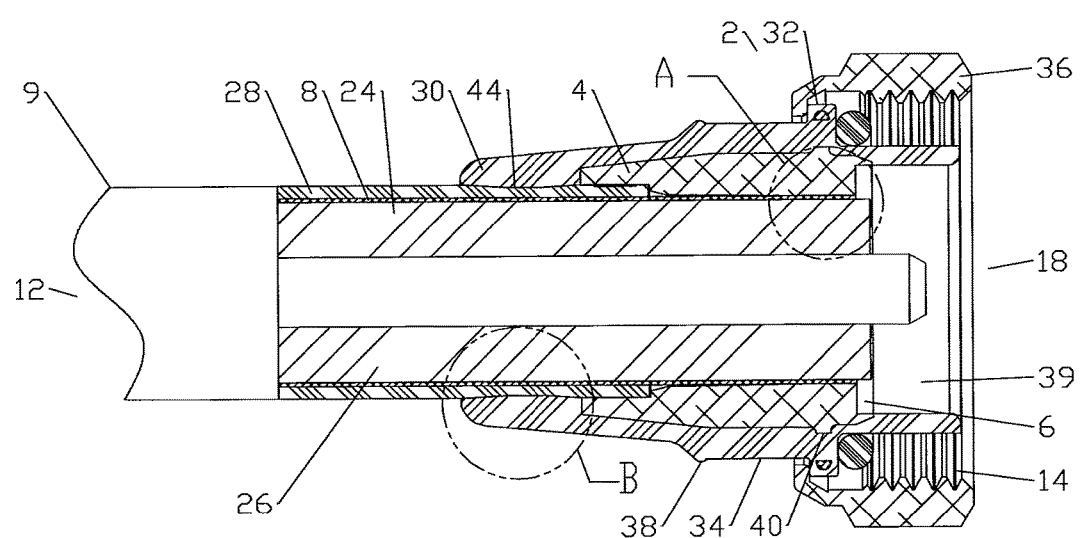
FIG. 4 is a schematic cross section side view of FIG. 2.
Figure 5:
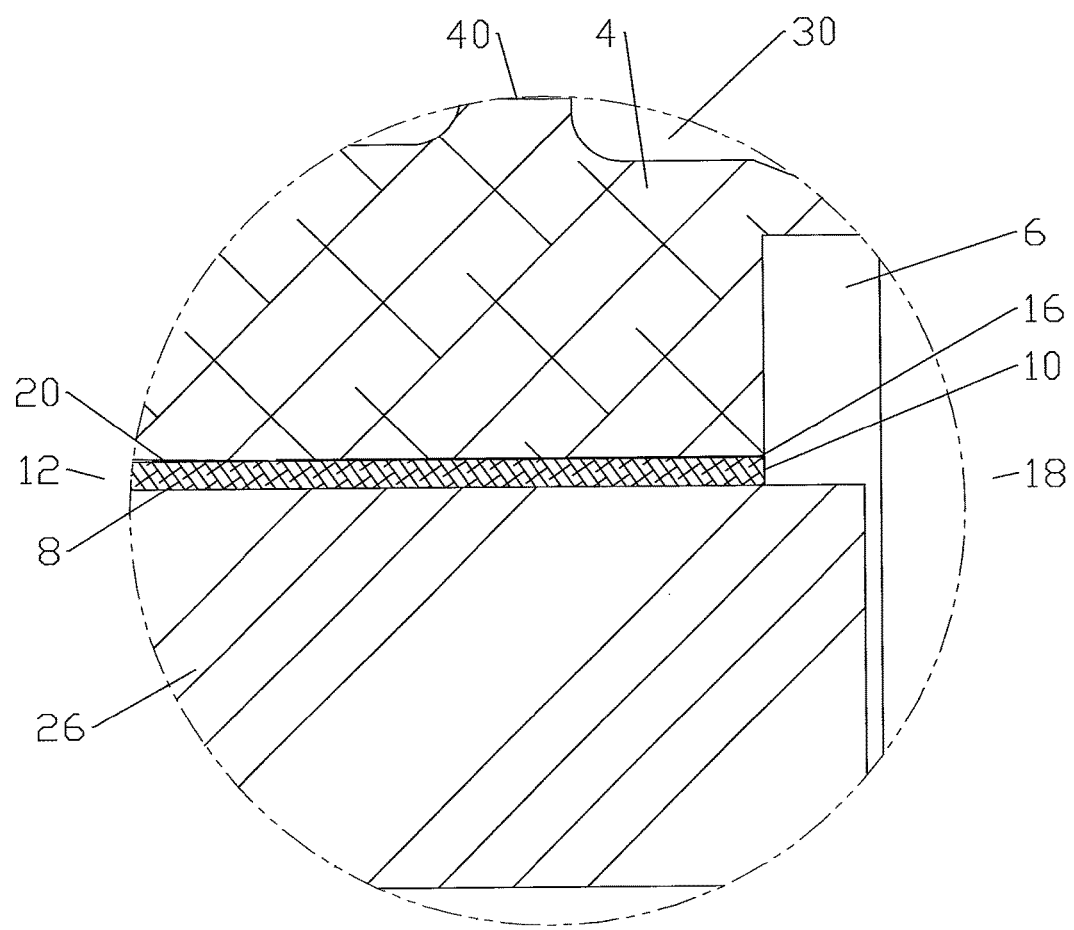
FIG. 5 is an enlarged view of area A of FIG. 4.

An exemplary embodiment of a laser weldable coaxial connector 2 is demonstrated in FIGS. 1-4. As best shown in FIG. 4, a unitary connector body 4 is provided with a bore 6 dimensioned to receive the leading edge of the outer conductor 8 of a coaxial cable 9 therethrough. Positioned for interconnection by laser welding, the leading edge of the outer conductor 8 extends through the bore 6 to a longitudinal position generally flush with the edge of a shoulder 10 of the connection interface 14 at the connector end 18, presenting a common end face to the connector end 18, as best shown in FIG. 5. The connection interface 14 may be any desired standard or proprietary connection interface 14 which includes access to a circumferential contact seam 16 between the bore 6 and the outer conductor 8, the seam 16 generally parallel to a longitudinal axis of the coaxial connector 2.

One skilled in the art will appreciate that connector end 18 and cable end 12 are applied herein as identifiers for respective ends of both the coaxial connector 2 and also of discrete elements of the coaxial connector 2 described herein, to identify the same and their respective interconnecting surfaces according to their alignment along a longitudinal axis of the coaxial connector 2 between a connector end 18 and a cable end 12.

Where the diameter of the bore 6 is selected with respect to the diameter of the outer conductor 8 to be a close tolerance fit, laser welding interconnection of the outer conductor 8 and the connector body 2 may be performed without the addition of further material, such as welding rod or wire. The high level of localized heating from the laser, applied to the seam 16 between the outer conductor 8 and the connector body 2, may be applied as a pulse directed to a target spot, with successive pulses applied to an overlapping spot portion to form a continuous weld between adjacent portions of the outer conductor 8 and the connector body 2.

Figure 6:
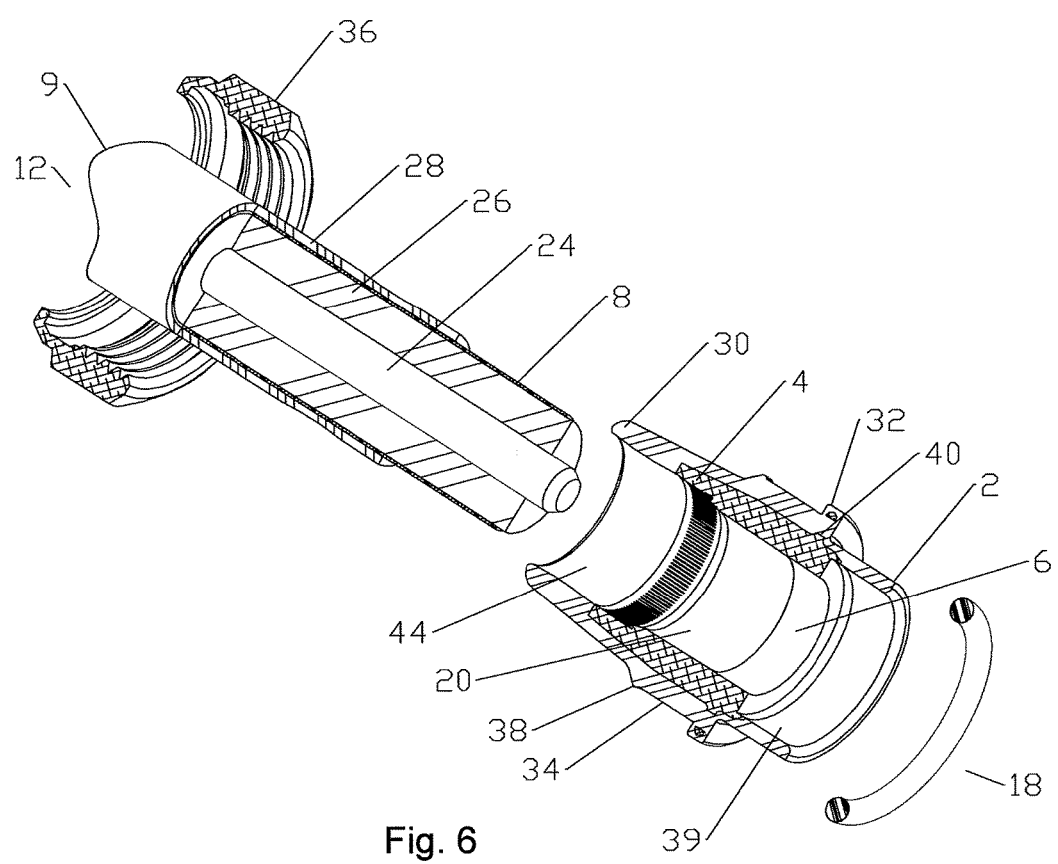
FIG. 6 is a schematic exploded isometric partial cut-away view of the connector and cable of FIG. 1.

Prior to interconnection via laser welding, the end of the cable 9 may be prepared, as best shown in FIG. 6, by cutting the cable 9 so that the inner conductor 24 extends from the outer conductor 8. Also, dielectric material 26 between the inner conductor 24 and outer conductor 8 may be stripped back and a length of the outer jacket 28 removed to expose desired lengths of each. A portion of the dielectric material 26 may be provided extending forward of the leading edge of the outer conductor 8, for example as an interconnection impedance discontinuity reduction feature.

Where applicable, the cable end preparation may also include the step of straightening the cable end portion, for example to eliminate any bending in the cable resulting from bulk cable delivery of the cable wound in spools, so that when inserted into the bore 6, the cable end is coaxial with the bore 6 along its length and the inner conductor 24 projects from the connector end 18 parallel to the longitudinal axis of the bore 6. Thereby, the seam between the bore sidewall 20 and the outer diameter of the outer conductor 8 will be uniform around the circumference of the outer conductor 8, increasing the uniformity of the resulting laser weld.

Because the localized heat of the laser welding process can disrupt aluminum oxide surface coatings in the immediate weld area, no additional care may be required with respect to removing or otherwise managing the presence of aluminum oxide on the interconnection surfaces.

Figure 10:
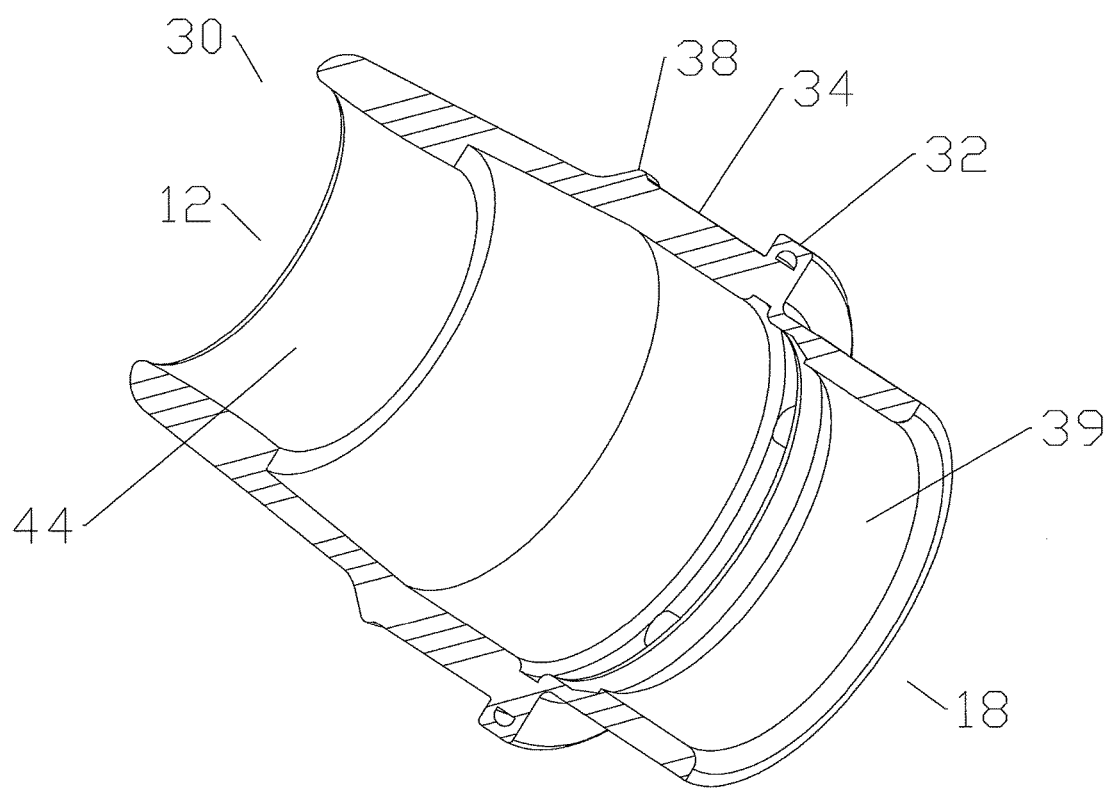
FIG. 10 is a schematic isometric cut-away view of the overbody of FIG. 5.

An overbody 30, as shown for example in FIG. 10, may be applied to the connector body 4 as an overmolding of polymeric material. The overbody 30 increases cable to connector torsion and pull resistance. The overbody 30 may also provide connection interface structure at the connector end 18 and further reinforcing support at the cable end 12, enabling significant reductions in the size of the connector body 4, thereby reducing overall material costs.

Depending upon the applied connection interface 14, demonstrated in the exemplary embodiments herein as a standard 7/16 DIN interface, the overbody 30 may be provided with an overbody flange 32 and longitudinal support ridges 34 for a coupling nut 36. The coupling nut 36 is retained upon the support ridges 34 at the connector end 18 by an overbody flange 32 and at the cable end 12 by a retention spur 38 provided on at least one of the support ridges 34. The retention spur 38 may be angled toward the connector end 18, allowing the coupling nut 36 to be placed over the cable 9 initially spaced away from the coaxial connector 2 during interconnection (see FIG. 1), but then allowing the coupling nut 36 to be passed over the retention spur 38 and onto the support ridges 34 from the cable end 12, to be thereafter retained upon the support ridges 34 by the retention spur(s) 38 (see FIG. 2) in close proximity to the connector interface 14 for connector to connector mating. The support ridges 34 reduce polymeric material requirements of the overbody 30 while providing lateral strength to the connector/interconnection 2 as well as alignment and retention of the coupling nut 36.

The overbody 30 may also extend from the connector end 18 of the connector body 4 to provide portions of the selected connection interface 14, such as an alignment cylinder 39 of the 7/16 DIN interface, further reducing metal material requirements of the connector body 4.

Figure 7:
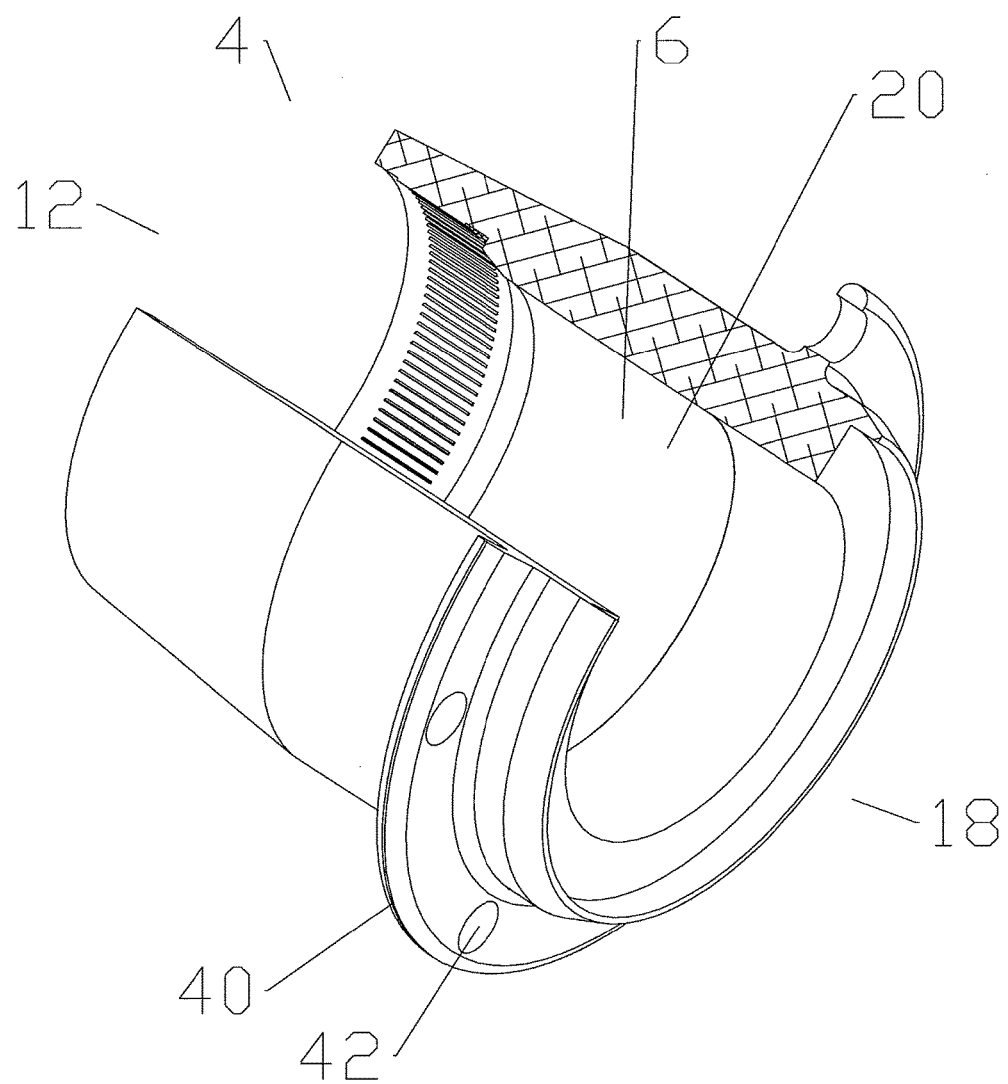
FIG. 7 is a schematic isometric partial cut-away view of the connector body of FIG. 5.
Figure 8:
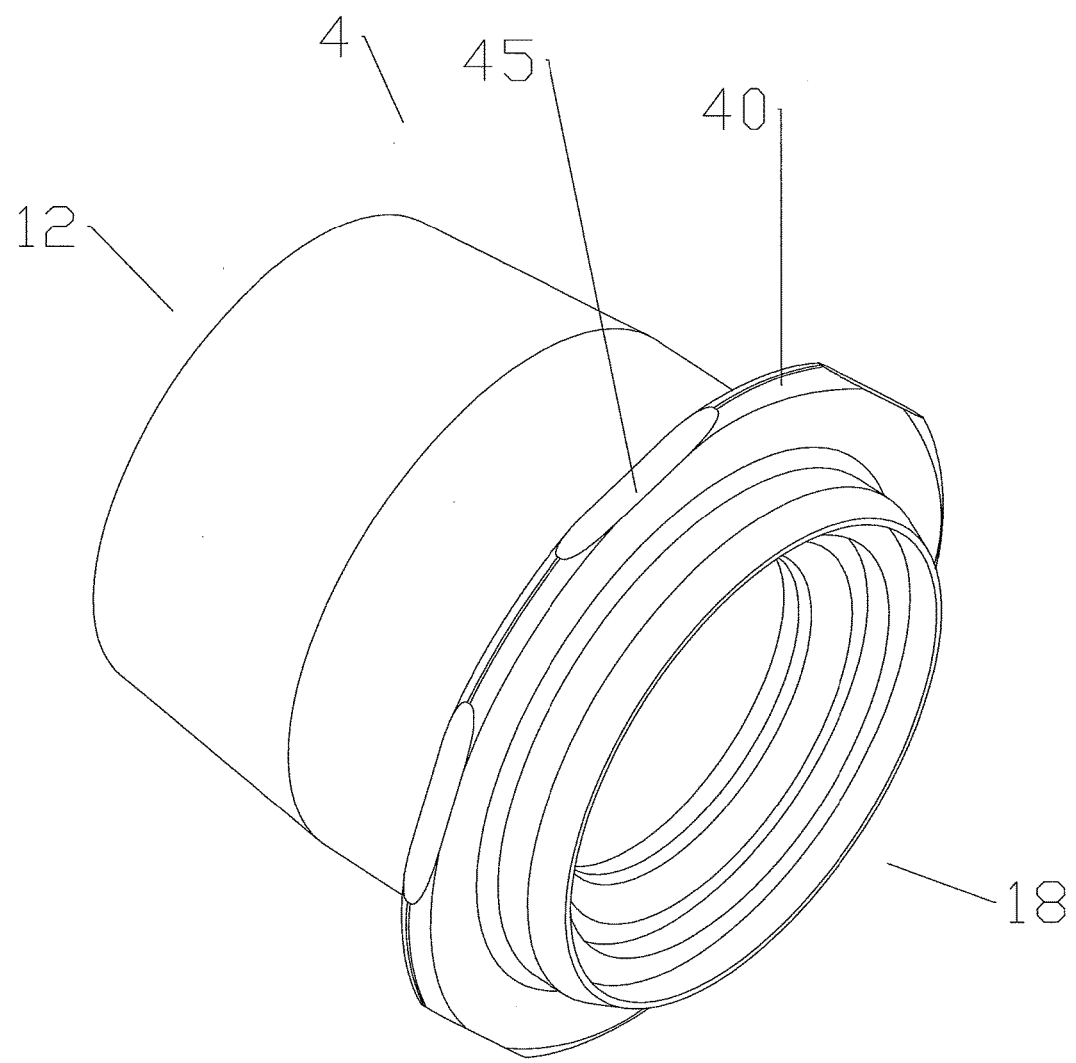
FIG. 8 is a schematic isometric view of an alternative connector body with notches on a flange of the connector body.
Figure 9:
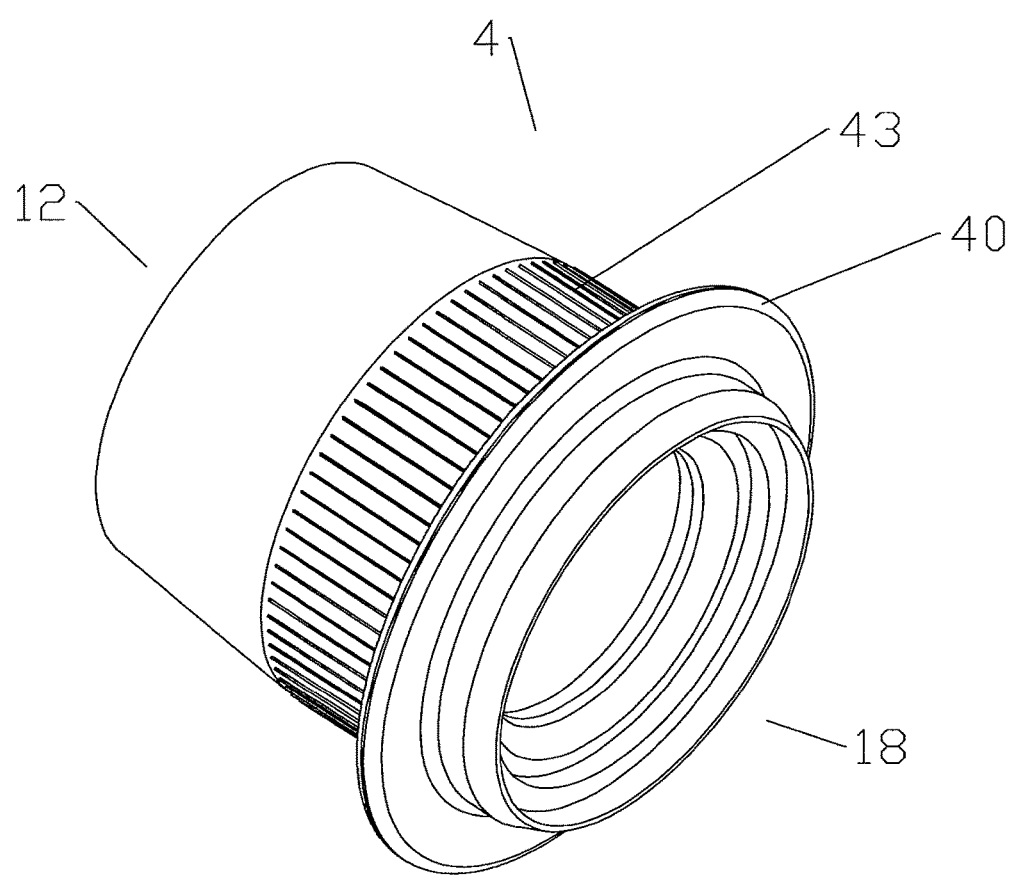
FIG. 9 is a schematic isometric view of an alternative connector body with longitudinal knurls on the connector body outer diameter.

The overbody flange 32 may be securely keyed to a connector body flange 40 of the connector body 4 and thereby with the connector body 4 via one or more interlock apertures 42 such as holes, longitudinal knurls 43, grooves, notches 45 or the like provided in the connector body flange 40 and/or outer diameter of the connector body 4, as demonstrated in FIGS. 7-9. Thereby, as the polymeric material of the overbody 30 flows into the interlock apertures 42 during overmolding, upon curing the overbody 30, for example as shown in FIG. 10, is permanently coupled to and rotationally interlocked with the connector body 4.

Figure 11:
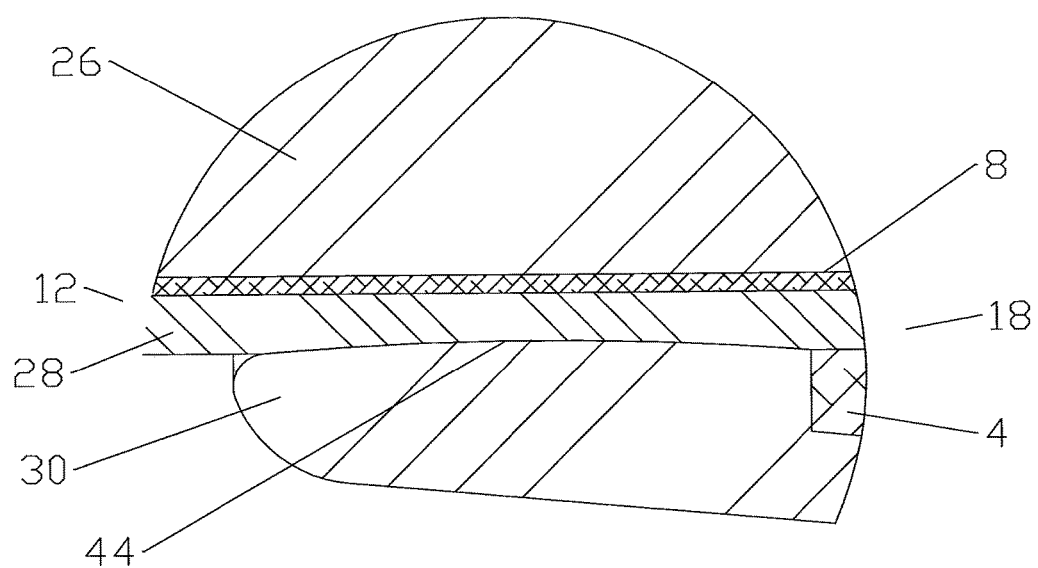
FIG. 11 is an enlarged view of area B of FIG. 4.
Figure 12:
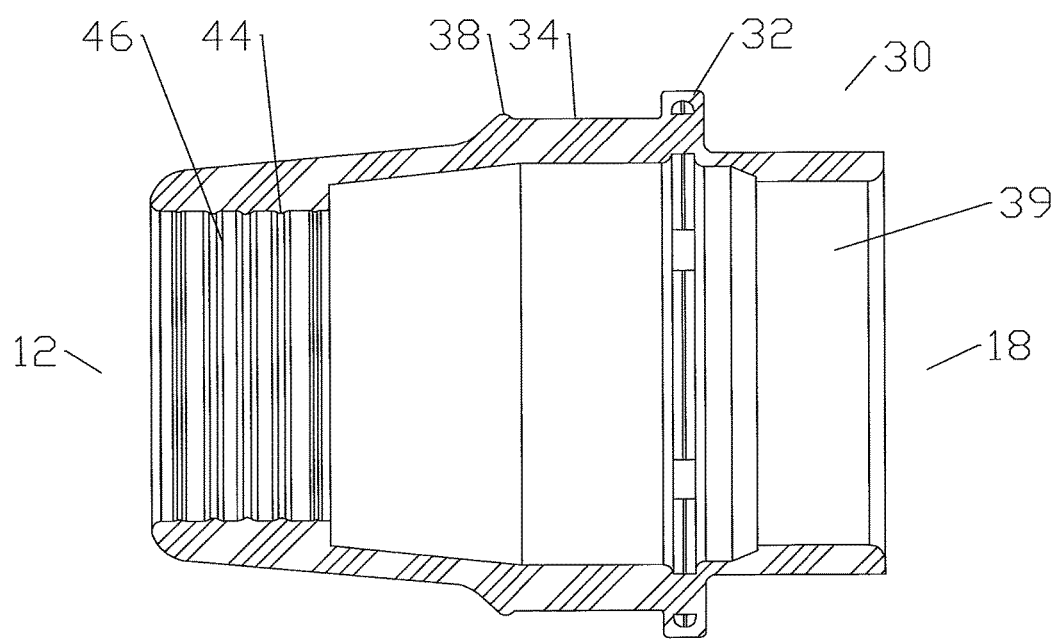
FIG. 12 is a schematic cross section side view of an alternative overbody with corrugation on an inner diameter of the cable end.
Figure 13:
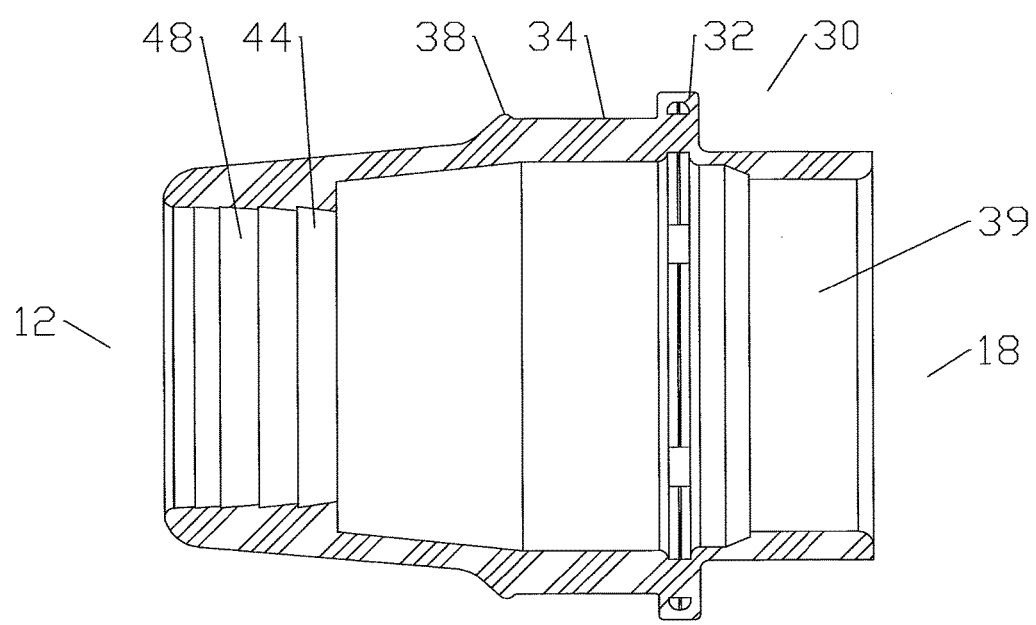
FIG. 13 is a schematic cross section side view of an alternative overbody with a stepped surface on an inner diameter of the cable end.

As best shown in FIG. 11, the cable end 12 of the overbody 30 may be dimensioned with an inner diameter friction surface 44 proximate that of the coaxial cable outer jacket 28, enabling polymeric friction welding between the overbody 30 and the outer jacket 28 prior to laser welding of the connector body 4 and outer conductor, thereby eliminating the need for environmental seals at the cable end 12 of the connector/cable interconnection. During friction welding, the coaxial connector 2 is rotated with respect to the cable 9. Friction between the friction surface 44 and the outer diameter of the outer jacket 28 heats the respective surfaces to a point where they begin to soften and intermingle, sealing them against one another. To provide enhanced friction and allow voids for excess flow due to friction displacement and add key locking for additional strength, the outer jacket 28 and and/or the inner diameter of the overbody 30 may be provided as a series of spaced apart annular peaks of a contour pattern such as a corrugation 46, as shown for example in FIG. 12, or a stepped surface 48, as shown for example in FIG. 13. Alternatively, the overbody 30 may be sealed against the outer jacket 28 with an adhesive/sealant or may be overmolded upon the connector body 4 after interconnection with the outer conductor 8, the heat of the injected polymeric material bonding the overbody 30 with and/or sealing against the outer jacket 28.

The inner conductor 24 extending from the prepared end of the coaxial cable 9 may be selected to pass through to the connector end 18 as a portion of the selected connection interface 14, for example as shown in FIG. 8. If the selected coaxial cable 9 has an inner conductor 24 that has a larger diameter than the inner conductor portion of the selected connection interface 14, the inner conductor 24 may be ground at the connector end 18 to the required diameter.

Figure 14:
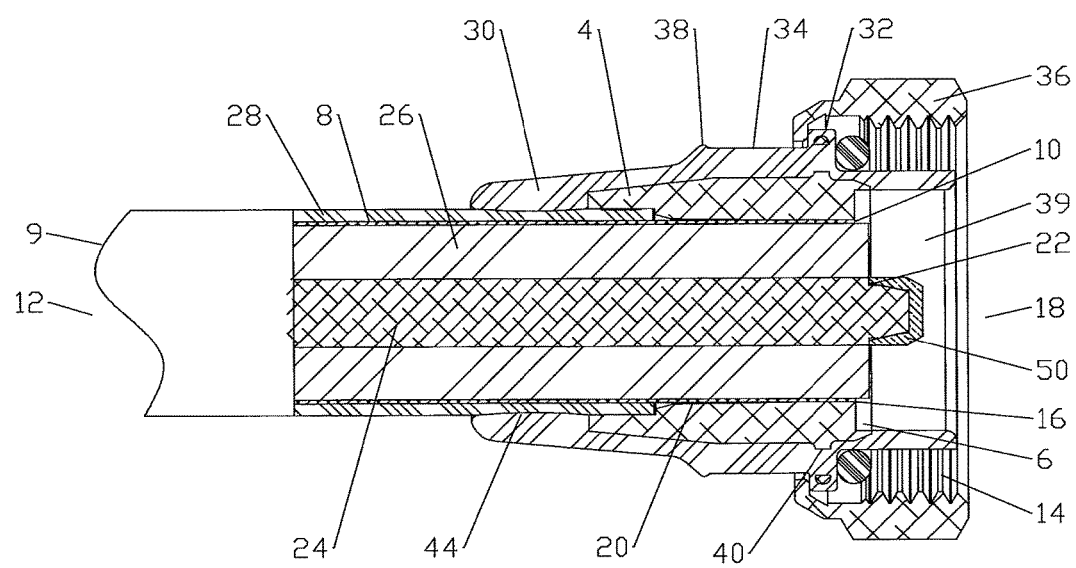
FIG. 14 is a schematic cross section side view of a coaxial connector embodiment with an inner conductor end cap.

Although a direct pass through inner conductor 24 advantageously eliminates interconnections, for example with the spring basket of a traditional coaxial connector inner contact, such may introduce electrical performance degradation such as PIM. Where the inner conductor 24 is also aluminum material some applications may require a non-aluminum material connection point at the inner contact/inner conductor of the connection interface 14. As shown for example in FIG. 14, a center cap 50, for example formed from a metal such as brass or other desired metal, may be applied to the end of the inner conductor 24, also by laser or friction welding. To apply the center cap 50, the end of the inner conductor 24 is ground to provide a pin corresponding to the selected socket geometry of the center cap 50. To allow material inter-flow during welding attachment, the socket geometry of the center cap 50 and or the end of the inner conductor 24 may be formed to provide annular material gaps 22.

Figure 15:
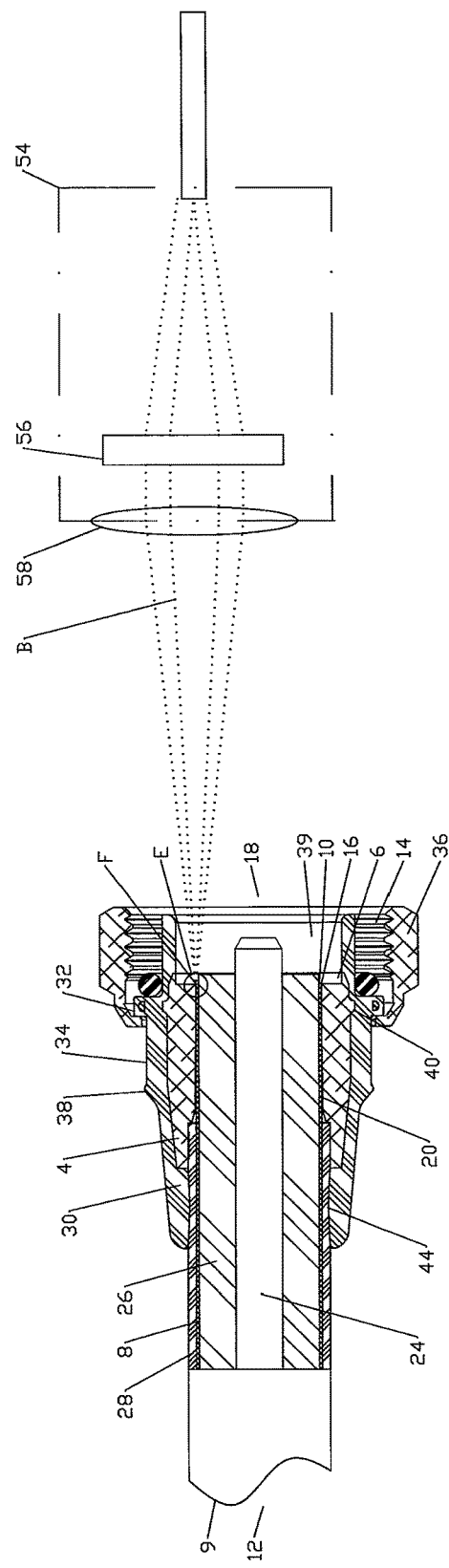
FIG. 15 is a schematic cross section side view of the coaxial connector of FIG. 4 demonstrating a laser beam path during laser welding.

Laser welding apparatus may be provided with a fiber optic laser head extension which may be adjusted to aim the laser beam B at each target location along the seam 16. Alternatively, the coaxial connector 2, upon which the target location resides, may be maneuvered to align the target location with respect to the laser head 54. A laser head 54 typically includes a collimator 56 and a focus lens 58 which focuses the laser beam B upon a focal point F at the target location. As shown in FIG. 15, the laser beam B extent has clearance requirements prior to reaching the focal point F which are satisfied by the connector end 18 facing orientation of the seam 16 in the exemplary embodiment.

Figure 16:
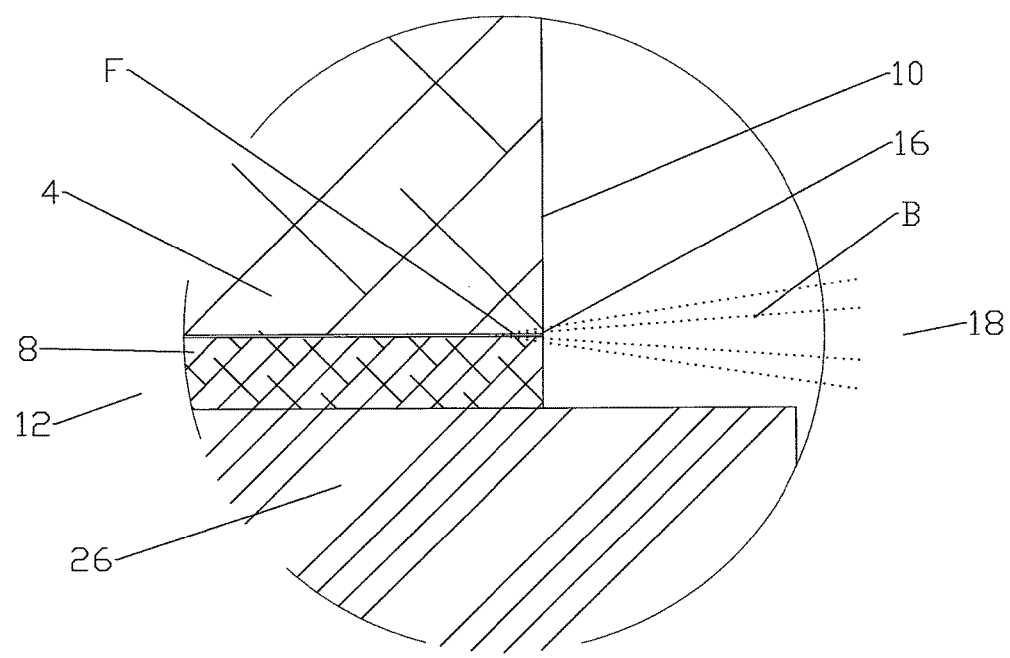
FIG. 16 is an enlarged view of area E of FIG. 15.

Prior to and once beyond the focal point F, the laser beam B has an increasing diameter, progressively diminishing the effective power of the beam at longitudinal locations other than the focal point F. To maximize heat generation for welding, the laser head 54 may be positioned with respect to the seam 16, such that the focal point F is below the seam 16 outer face, for example as shown in FIG. 16. Thereby, the highest power level is obtained as a molten area of the bore sidewall 20 and the outer diameter of the outer conductor 8 is formed within the seam 16, rather than only along the outermost surface of the seam 16, resulting in a weld with greater depth and strength.

Figure 17:
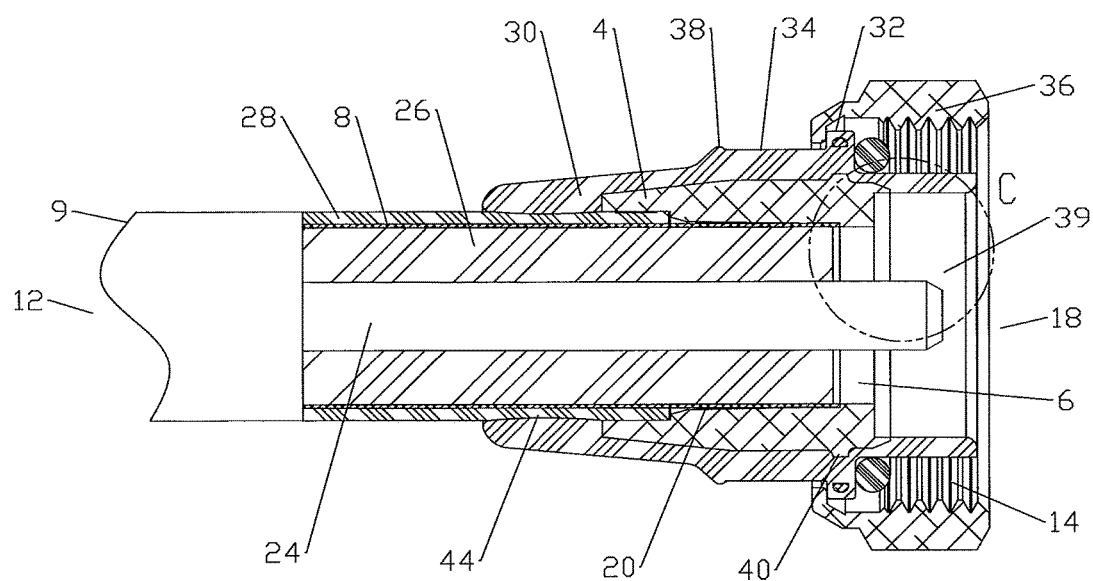
FIG. 17 is a schematic cross section side view of an alternative embodiment of a coaxial connector for laser welding interconnection.
Figure 18:
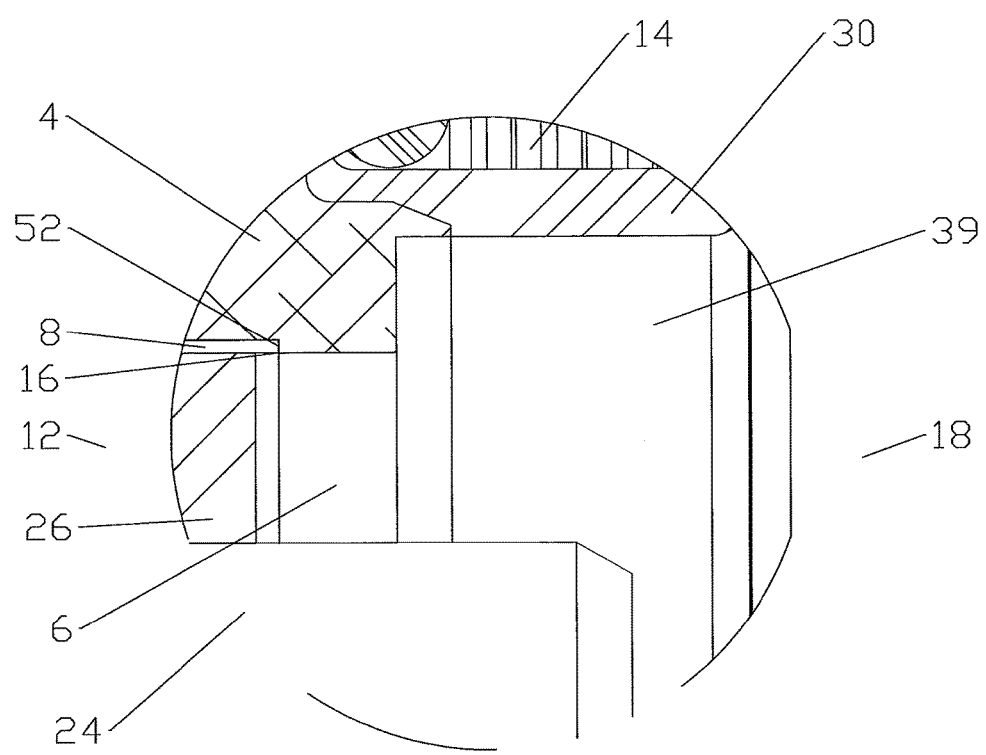
FIG. 18 is an enlarged view of area C of FIG. 17.
Figure 19:
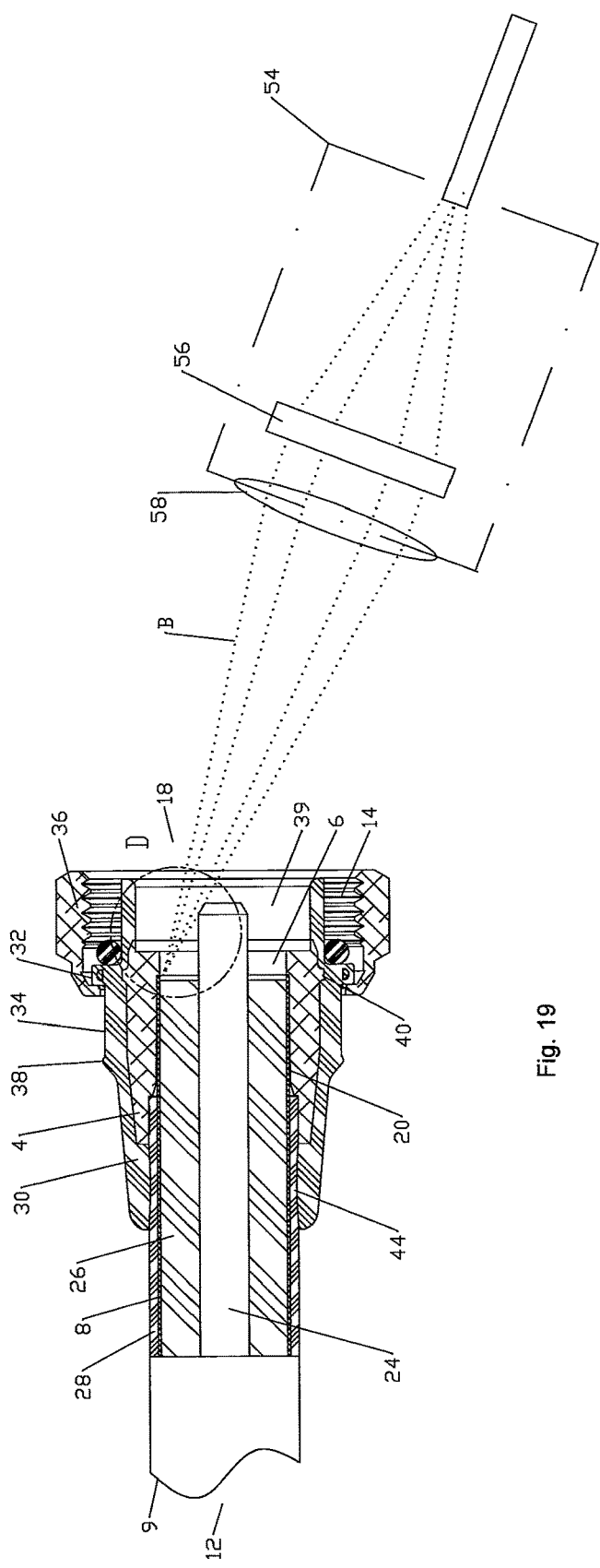
FIG. 19 is a schematic cross section side view of the coaxial connector of FIG. 17 demonstrating a laser beam path during laser welding.
Figure 20:
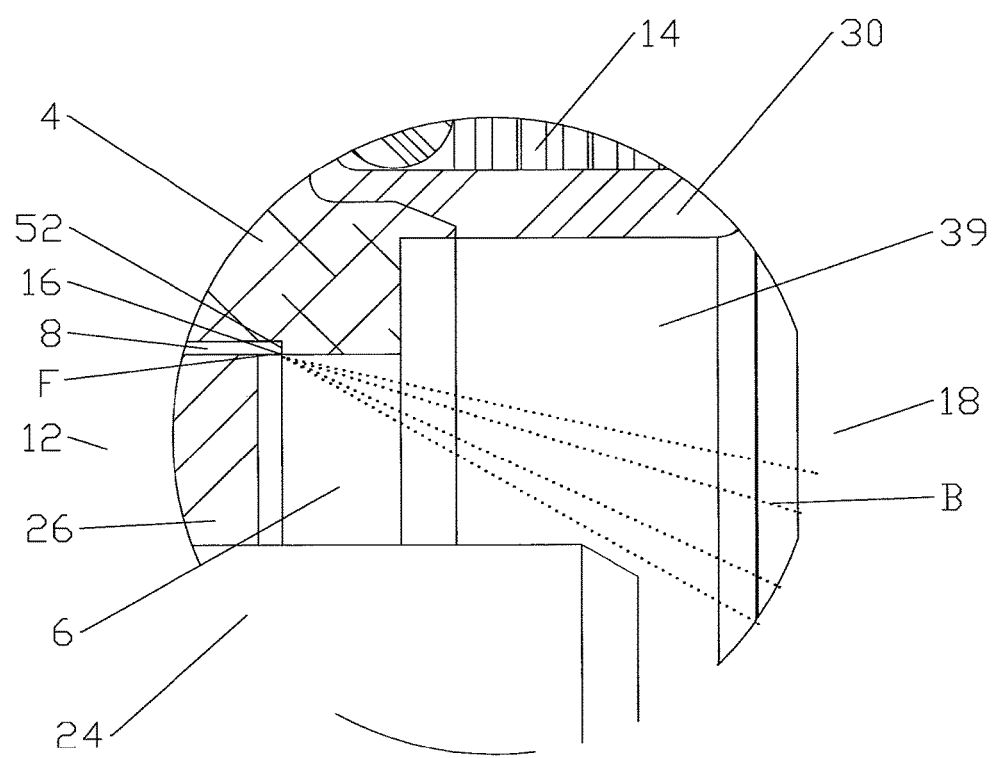
FIG. 20 is an enlarged view of area D of FIG. 19.

In further embodiments, for example as shown in FIGS. 17 and 18, the bore 6 may be provided with an inward projecting stop shoulder 52 proximate the connector end 18 against which the outer conductor 8 abuts to form an inward facing circumferential seam 16 between the outer conductor 8 and the stop shoulder 52. The seam 16 is provided generally normal to a longitudinal axis of the coaxial connector 2. As shown in FIGS. 19 and 20, the ability of the laser beam B to reach the seam 16 without interference from the inner conductor 24 is a function of the coaxial cable dimensions and the distance from the connection interface 14 within the bore 6 at which the seam 16 is located.

In addition to increased adjustment requirements for the laser beam to follow the inner circumference of the seam 16, the present embodiment also requires removal of additional dielectric material 26, which may generate impedance discontinuity issues addressable by the addition of further impedance tuning features, such as dielectric spacers or the like.

One skilled in the art will appreciate that the connector and interconnection method disclosed has significant material cost efficiencies and provides a permanently sealed interconnection with reduced size and/or weight requirements.

| Table of Parts | |
|---|---|
| 2 | coaxial connector |
| 4 | connector body |
| 6 | bore |
| 8 | outer conductor |
| 9 | cable |
| 10 | shoulder |
| 12 | cable end |
| 14 | connection interface |
| 16 | seam |
| 18 | connector end |
| 20 | bore sidewall |
| 22 | material gap |
| 24 | inner conductor |
| 26 | dielectric material |
| 28 | outer jacket |
| 30 | overbody |
| 32 | overbody flange |
| 34 | support ridge |
| 36 | coupling nut |
| 38 | retention spur |
| 39 | alignment cylinder |
| 40 | connector body flange |
| 42 | interlock aperture |
| 43 | longitudinal knurl |
| 44 | friction surface |
| 45 | notch |
| 46 | corrugation |
| 48 | stepped surface |
| 50 | center cap |
| 52 | stop shoulder |
| 54 | laser head |
| 56 | collimator |
| 58 | focus lens |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A coaxial connector interconnected with a coaxial cable, with an outer conductor and an inner conductor, by a process comprising:
providing a connector body with a bore;
inserting a leading end of the coaxial cable into the bore from a cable end of the connector body, and
laser welding between the outer conductor and the connector body from, a connector end of the connector body;
wherein the leading end of the coaxial cable is inserted into the bore until a leading edge of the outer conductor axially abuts a stop shoulder proximate a connector end of the bore;
wherein providing a connector body with a bore includes preparing the leading end of the cable end prior to insertion into the bore by removing a portion of the outer conductor so that an inner conductor extends therefrom, removing a portion of a dielectric material between the inner conductor and the outer conductor such that the dielectric material is recessed within the leading end of the coaxial cable.

2. The coaxial connector interconnected with a coaxial cable of claim 1, wherein an inner conductor cap is laser welded upon the inner conductor.

3. The coaxial connector interconnected with a coaxial cable of claim 1, further including the step of coupling an overbody to the connector body.

4. The coaxial connector interconnected with a coaxial cable of claim 1, further including stripping back a portion of a jacket from the outer conductor.

5. The coaxial connector interconnected with a coaxial cable of claim 1, further including providing an overbody of polymeric material upon an outer diameter of the connector body, the overbody extending from the cable end of the connector body, an inner diameter of the overbody extending from the cable end of the connector body provided as a friction surface dimensioned for an interference fit upon an outer diameter of a jacket of the coaxial cable.

6. The coaxial connector interconnected with a coaxial cable of claim 1, wherein the laser welding is applied as a continuous circumferential weld.

7. The coaxial connector interconnected with a coaxial cable of claim 1, wherein the laser welding is applied as a plurality of spot welds with adjacent spot welds applied partially overlapping one another.

8. The coaxial connector interconnected with a coaxial cable of claim 1, wherein the laser welding is applied with a focal point of a laser beam positioned below a surface of a joint between the outer conductor and the connector body.

9. The coaxial connector interconnected with a coaxial cable of claim 1, wherein a head coupled to a laser by fiber optic cable is adjusted with respect to the circumferential seam to apply the laser welding.

10. The coaxial connector interconnected with a coaxial cable of claim 1 wherein the connector body is manipulated with respect to a laser beam to apply the laser welding.

* * * * *

UNITED STATES PATENT AND TRADEMARK OFFICE
CERTIFICATE OF CORRECTION

PATENT NO. : 10,431,909 B2
APPLICATION NO. : 14/479991
DATED : October 1, 2019
INVENTOR(S) : Vaccaro et al.

Page 1 of 1

It is certified that error appears in the above-identified patent and that said Letters Patent is hereby corrected as shown below:

In the Claims

Column 6, Line 54, Claim 1: delete "from, a" and insert -- from a --

Signed and Sealed this
Tenth Day of December, 2019

Andrei Iancu
*Director of the United States Patent and Trademark Office*